United States Patent [19]

Seymour

[11] 4,294,062
[45] Oct. 13, 1981

[54] SENSING BAR

[75] Inventor: Shaun A. Seymour, New Holland, Pa.

[73] Assignee: Sperry Corporation, New Holland, Pa.

[21] Appl. No.: 134,721

[22] Filed: Mar. 27, 1980

[51] Int. Cl.³ ............................................. A01F 12/10
[52] U.S. Cl. .............................. 56/102; 56/DIG. 15; 130/27 JT
[58] Field of Search .................... 56/10.2, DIG. 15; 130/27 JT, 27 S, 27 R; 198/719; 209/1, 247, 261, 263, 590, 592, 593, 698, 935

[56] References Cited

U.S. PATENT DOCUMENTS 3,675,660  7/1972  Girodat ........................ 130/27 JT
3,896,608  7/1975  Garrott .......................... 56/10.2

FOREIGN PATENT DOCUMENTS 2448745  4/1976  Fed. Rep. of Germany .... 56/DIG. 15

Primary Examiner—Jay N. Eskovitz
Attorney, Agent, or Firm—Larry W. Miller; Frank A. Seemar

[57] ABSTRACT

In an infeed housing for a harvesting and threshing machine there is provided an improved sensing bar design that incorporates an inclined section into the bar to increase the percentage of impactions likely to occur by rocks and other non-frangible objects thereagainst as they are transported upwardly through the infeed housing. The sensing bar is also mounted to the bottom surface of the infeed housing in an improved acoustically isolating manner to decrease the noise level to which the sensing bar will be subjected during operation.

12 Claims, 3 Drawing Figures

SENSING BAR

BACKGROUND OF THE INVENTION

This invention relates generally to crop harvesting and threshing machines, more commonly known as combines, and more particularly to a sensing bar or plate mounted in the infeed housing that is attached to the front of the base unit of the combine. The sensing bar is used to detect stones or other non-frangible objects which are transferred to the infeed housing with crop material from the harvesting attachment or header before such objects are conveyed upwards into the base unit where the threshing operation occurs. Specifically, the invention is concerned with the shape of the contacting surface of the sensing bar and the acoustical isolation means employed to maximize the number of impactions of stones and other non-frangible objects with the bar, increase the sensitivity of the bar to such impactions and decrease the amount of noise transmitted via the infeed housing from the header and the combine to the sensing bar during operation. The net effect of this cooperative interaction between the shape of the sensing bar and the acoustical isolation means is, sequentially, the successful detection by a stone and non-frangible object detecting apparatus and the ejection from the infeed housing of such an object by object ejecting apparatus.

In the prior conventional types of combines, stone traps were routinely provided to separate out large hard objects or stones that generally were greater than three or four inches in size. The stone traps provided in the conventional combines were utilized generally in two types of stone ejecting systems. The passive type of stone ejecting system employed a stone trap with a space or gap between the top of the crop elevator or conveyor within the infeed housing and the base unit threshing apparatus. In this type of an ejecting system hard objects or stones were conveyed upwardly along with the crop material from the header through the infeed housing towards the threshing apparatus. When the crop material passed over the gap, stones by their very weight would fall down through the gap into the stone trap. Those stones that were carried along with the crop material past the stone trap were passed into contact with the threshing cylinder, which generally was rotatably mounted transversely to the longitudinal axis of the combine. If the hard objects or stones were of sufficient size so that they would not easily pass between the threshing cylinder and the threshing concaves, they would be thrown backwardly by the rotation of the cylinder into the gap or space. Thus, this particular cooperation between the threshing cylinder and the stone trap created an almost natural stone ejecting system for conventional combines. Even if a stone did pass into the threshing cylinder it made only one pass about the cylinder and across the underlying concave, usually doing minimal damage to the threshing apparatus before it was passed on through and ejected from the combine.

The second type of stone ejecting system generally employed an active system which utilized some sort of a detecting system to detect the presence of a stone or other non-frangible object. Typically an electronic sensor, such as an acoustic transducer usually in the form of a piezoelectric disc, is mounted in a sensing plate and is used in conjunction with a stone trap. The electronic sensor responded to the characteristics of the sound, such as the amplitude and frequency, that an impacting stone generated in the sensing bar. This signal would then be transferred through an electronic circuit that filtered out the range within which the amplitude and frequency was characteristic of stones. Within this characteristic spectral range the electronic circuit automatically activated a latch releasing mechanism on a door along the bottom of the infeed housing that would pivot open to permit the stones or hard objects to be ejected from the infeed housing along with a small amount of crop material.

This latter or active type of sensing system utilizing a latched trap door that was automatically opened upon impact of a rock or hard object against the sensing bar was an appreciable step forward in stone detecting and ejecting technology. However, because the stones or hard objects were generally passed along the predetermined path of travel with the crop material, it was possible for a stone or other hard object to pass over the sensing bar with the crop material without striking the bar. Then the undetected stones or hard objects would still pass upwardly through the infeed housing into the threshing apparatus, where they would pass with the crop material about the threshing concave and the threshing cylinder. Again, because it was only a single pass of crop material about a portion of the conventional transverse threshing cylinder and across a relatively narrow strip of concave, the undetected and therefore unejected stones still caused minimal damage to the combine.

An alternate type of active stone ejecting system utilized a pinch roll rotatably mounted in the infeed housing at a predetermined distance above the trap door. When a stone of sufficient size was carried by the crop elevator between the pinch roll and the trap door into compressive engagement therewith, the rotation of the pinch roll exerted a downward force through the stone against the trap door. The trap door was spring loaded closed so that above a predetermined pressure the door would be forced open, thereby causing the stone to be directed downwardly and out of the infeed housing through the opening created by the opened trap door. An obvious drawback to this system was the fact that large, but relatively flat stones or hard objects capable of passing between the pinch roll and the trap door were ingested into the combine where they could still damage the operating components.

The advent of rotary or axial flow type of combines with single or multiple threshing and separating rotors utilized in an orientation where the longitudinal axis of each rotor is either parallel or transverse to the longitudinal axis of the combine presented a greater need for more effective stone eliminating or ejecting systems. This increased need stems from two principal facts. Axial flow combines generally do not have a transverse threshing cylinder at the top of the infeed housing to throw or direct stones or other damage inducing objects back into the stone trap. They also pass the crop material about the periphery of each rotor as many as five or six times during threshing and separation as the crop material progresses axially along the length of each rotor.

An improved electronic stone or hard object detecting system was developed, as shown and described in copending U.S. patent application Ser. No. 109,932, filed Jan. 4, 1980 and assigned to the assignee of the present invention, utilizing a sensing bar that is positioned transversely across the bottom of the infeed housing astride the path of crop flow from the header to the base unit of the combine. In this type of a system the reaction time for the opening of the trap door is relatively short and, because the crop material in an axial flow combine makes multiple passes about the rotor as it is transferred along the length of the concave during the threshing and separating cycle, the detection and subsequent elimination of detected stones and hard objects becomes more critical. A stone or other non-frangible object passing through an axial flow type of combine is more apt to damage the entire length of the concaves, which with their rasp or rub bar cooperate with the rotors to thresh the crop material. In marked contrast, a stone passing through a conventional type of combine with a transversely oriented threshing cylinder and underlying concave contacts only a very small portion of the concave and is therefore likely to cause relatively little damage in its single pass about a portion of the cylinder. Thus, any improvements to the detecting system would enhance the effectiveness of the overall ejecting system. Particularly, increasing the percentage of objects striking the sensor bar will enhance the effectiveness.

Additionally, the ejecting system disclosed in the aforementioned copending patent application employs a sensing system that is shock mounted on rubber mounts to reduce the interfering noise transmitted to the sensing bar that routinely is generated by the moving parts of the header, infeed housing and combine during operation. This system of mounting the bar suffers from the serious disadvantage of permitting relatively large amounts of crop material to escape between the sensing bar and the bottom surface of the infeed housing where there is a sizable gap.

The foregoing problems are solved in the design of the sensing bar comprising the present invention by providing an improved sensing bar design that incorporates an inclined section into the bar to increase the percentage of impactions likely to occur by rocks and other non-frangible objects thereagainst as they are transported upwardly through the infeed housing. The sensing bar is also mounted to the floor bottom surface of the infeed housing in an improved acoustically isolating manner to decrease the noise level to which the sensing bar will be subjected during operation and reduce the quantity of crop material that is lost from the infeed housing at the junction of the sensing bar and the infeed housing floor.

BRIEF DESCRIPTION OF THE DRAWINGS

The features and advantages of this invention will become apparent upon consideration of the following detailed disclosure of the invention, especially when it is taken in conjunction with the accompanying drawings wherein.

SUMMARY OF THE INVENTION

It is a principal object of the present invention to provide in an infeed housing for a combine an improved sensing bar design that will create a greater sensitivity to rocks and other non-frangible objects as they pass over the bar with the crop material.

It is another object of this invention to provide an improved mounting means for the sensing bar in the infeed housing to acoustically isolate the sensing bar from the interfering noise that is generated by the moving parts on the combine during normal field operation and to decrease the amount of crop material that is lost from the infeed housing at the junction of the sensing bar and the infeed housing floor.

It is a feature of the present invention that there is a ramp incorporated into the design of the sensing bar to redirect the path of travel of crop material and rocks or other non-frangible objects as they are conveyed through the infeed housing, thereby increasing the number of impactions against the sensing bar by the rocks and other non-frangible objects.

It is another feature of the present invention that the ramp or upwardly angled portion of the sensing bar directs rocks and other non-frangible objects up into the overlying guide drum which in turn redirects the objects downward into contact with the sensing bar.

It is a further feature of the present invention that the sensing bar is mounted along its opposing edges with an acoustically isolating material.

It is an advantage of the present invention that there is achieved a greater sensitivity to and a higher percentage of impactions against the sensing bar by rocks and other non-frangible objects as they pass across the bar.

It is a further advantage that this ramp portion of the sensing bar generally causes a more distinct characteristic signal to be analyzed by the detector means, as a result of the impactions against the sensing bar, thereby increasing efficiency of the stone detecting and ejecting system.

It is yet another advantage that the acoustic isolation means decrease the amount of interference with the detecting system caused by the natural vibrations of the harvesting attachment, infeed housing and combine during normal field operations.

These and other objects, features and advantages are obtained by providing in a combine an improved sensing bar that is mounted in an acoustically isolating fashion to the infeed housing so that the design of the sensing bar increases the percentage of impactions thereagainst by rocks and other non-frangible objects as well as decreasing via its improved mounting the amount of crop material lost from the infeed housing and decreasing the amount of interfering noise that is transmitted to the sensing bar during the normal field operation of the header, infeed housing and combine.

DETAILED DESCRIPTION OF THE PREFERRED EMBODIMENT

Figure 1:
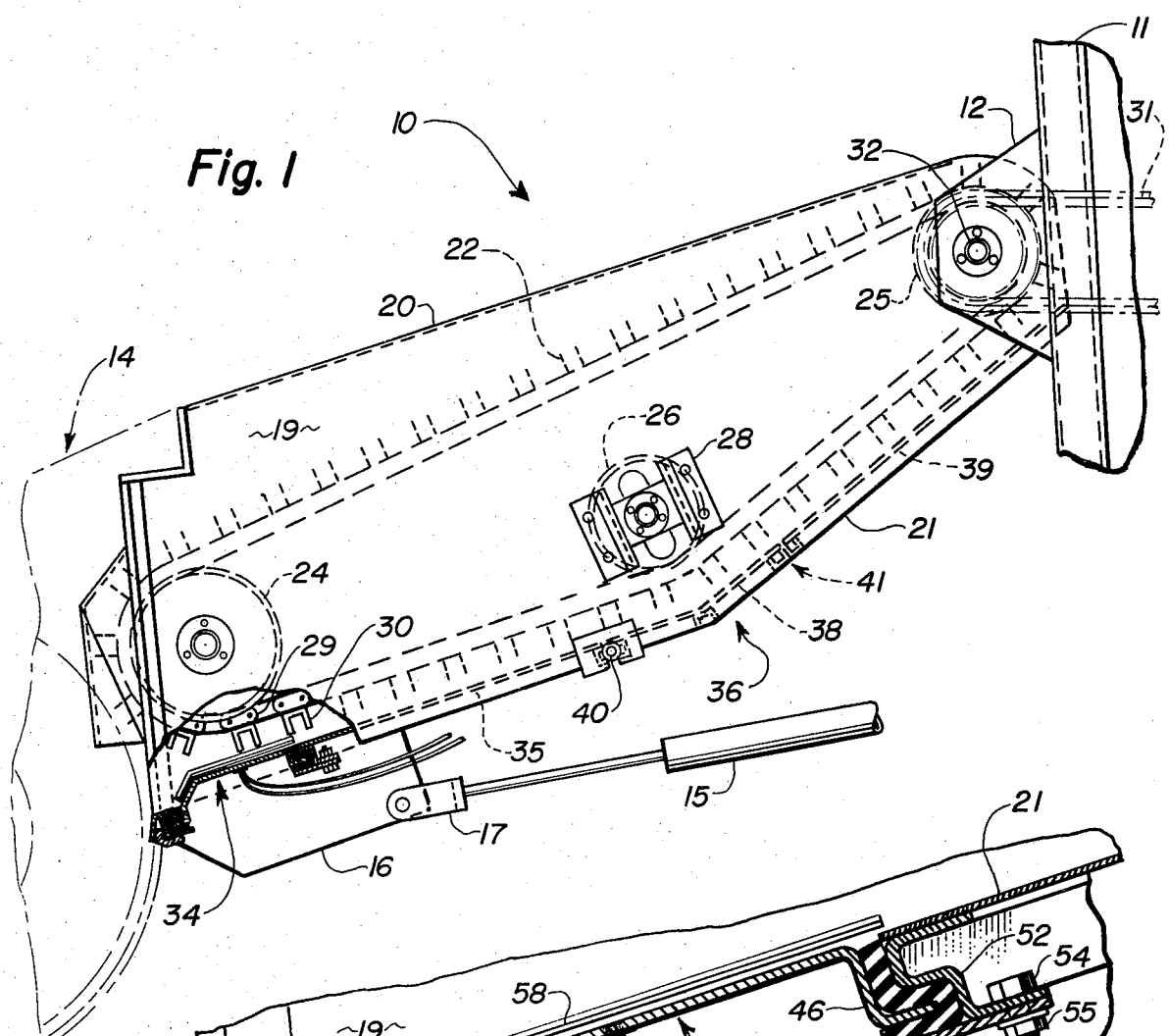
FIG. 1 is a side elevational view of an infeed housing of a combine with a portion broken away to show the sensing bar of the present invention mounted thereto.

Referring to FIG. 1, there is shown infeed housing 10 in side elevational view with the critical portions of this invention illustrated by having a portion of the infeed housing broken away. As can be seen in fragmentary manner, the infeed housing 10 is moveably affixed to the main frame of the combine via a vertical support beam 11. The infeed housing 10 is affixed to the support beam 11 via a pivotable mounting 12 within which the housing is hinged. The infeed housing 10 with its attached header, indicated generally by the numeral 14, is raised and lowered about the pivot point in mounting 12 by a pair of hydraulic cylinders 15, only one of which is shown. The hydraulic cylinder 15 is appropriately mounted to a mounting bracket 16 by coupling 18. On their opposing ends (not shown) hydraulic cylinders 15 are suitable fastened to the main frame of the combine.

The infeed housing 10 further comprises a pair of opposing side walls 19, only one of which is shown, which serve to connect and support a top surface 20 and a bottom surface 21. The infeed housing 10 has a crop elevator, indicated generally by the numeral 22, that is moveably mounted about a front guide drum 24 and a rear driving drum 25. A pinch roll 26 further serves to guide the crop elevator 22 and is appropriately mounted for rotation in mounting 28 to the side walls 19 of the housing 10. The crop elevator 22 comprises generally three spaced apart chains 29, only one of which is shown, interconnected by a plurality of U-shaped slats 30. The two outside chains 29 generally pass about sprockets (not shown) on the opposing ends of the shafts which pass through the driven front guide drum 24 and the rear driving guide drum 25.

As seen in FIG. 1, the crop elevator 22 is driven in a counterclockwise direction by the drive means 31 which transfers rotary power from the base unit of the combine. The driven means 31 are typically in the form of chains or belts which cooperate with sprockets or sheaves, respectively, to transfer the rotary power to the shaft 32, thereby imparting a driving force to the drum 25. This counterclockwise direction of movement of the crop elevator 22 serves to carry the crop material from the header upwardly and rearwardly along its predetermined path of travel toward the threshing and separating apparatus in the base unit of the combine, not shown. The infeed housing 10 has an opening in its forward portion adjacent the header between the side sheets 19 which permits the crop material that has been collected from the field to be transferred by the header 14 into the infeed housing. Similarly, at its rear the infeed housing 10 has an appropriate opening to permit the crop material to be passed into the threshing and separating apparatus of the combine.

The bottom surface 21 of the infeed housing 10 is comprised of two major portions with four distinct sections. Across the front of the infeed housing 10 there is a sensing plate or bar, indicated generally by the numeral 34, which spans its entire width. The sensing bar 34 is the first section of the infeed housing 10, while the bottom surface 21 continues with a second section 35 that is in the same flow plane as the upper surface of the sensing bar 34. Next, an object ejecting means in the form of a pivotally mounted trap door 36 that is positioned and designed so the crop material initially follows the flow path defined by the top portion of the sensing bar 34 and the second section 35 of the infeed housing 10. At a predetermined point in the length of the trap door 36, the door is angled upwardly in a generally oblique direction from the direction of travel of the crop material defined by the first portion of the infeed housing. This upwardly or obliquely inclined portion of the trap door 36, indicated by the numeral 38, defines the path which the crop material will follow as it is conveyed by the crop elevator 22 upwardly from the second section 35 of the infeed housing 10 into the threshing and separating apparatus of the combine. This obliquely inclined portion 38 of the trap door 36 also is the starting point for the second portion of the infeed housing bottom surface 21.

The last section of the second portion of the infeed housing bottom surface 21 comprises a section 39 which continues in the upwardly extending direction along the same general axis as that established by the obliquely inclined portion 38 of the trap door 36. Thus, the floor of the infeed housing 10 establishes and defines a flow path for the crop material in conjunction with the crop elevator 22 that serves to convey the crop material from the header 14 upwardly into the threshing and separating apparatus of the combine.

The trap door 36 is hingedly mounted at location 40 to the underside of section 35. The opposing end of the trap door 36 has an appropriate latching mechanism indicated generally by the numeral 41, affixed to its underside. The latching mechanism 41 serves to hold the trap door 36 in the closed position during operation.

Figure 2:
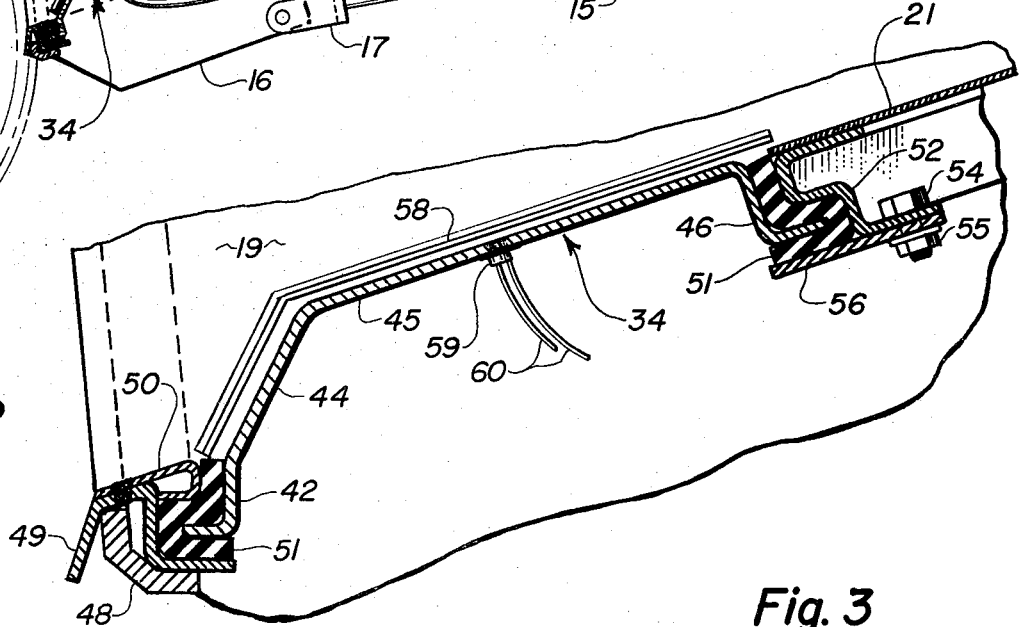
FIG. 2 is an enlarged fragmentary side elevational view of the sensing bar mounted to a portion of the infeed housing showing the sensing bar in greater detail.

Taking a closer look at the sensing bar 34 in FIG. 2, it is seen that the bar 34 consists of a front L-shaped mounting section 42, a ramp section 44, a guide section 45, and a rear L-shaped mounting section 46. At the front section of the infeed housing 10 it is seen that a front support member 48 has a receiving section 49 appropriately affixed thereto, such as by welding. Section 49 is appropriately shaped to receive the front L-shaped mounting section 42 of the sensing bar 34. Spot welded to the top of section 49 is a retaining member 50 which serves to keep the front L-shaped mounting section 42 of the sensing bar 34 from moving upwardly. Placed between the L-shaped mounting section 42 of the sensing bar 34 and the front support member 48 is a piece of extruded rubber 51. The rubber 51 spans the entire width of the sensing bar and serves to acoustically isolate the sensing bar 34 from the vibration normally transmitted by the infeed housing 10 during operation. A similar strip of extruded rubber 51 serves to acoustically isolate the sensing bar 34 at its rear L-shaped mounting section 46.

This rear strip 51 is placed between the L-shaped mounting section 46 and appropriately shaped support member 52 of the bottom surface 21. At its lower rearmost portion support member 52 has a suitably sized opening (not shown) to permit a retaining bolt 54 to pass therethrough. Bolt 54, in conjunction with locking washer and nut 55, is utilized to secure retaining member 56. Retaining member 56 is merely an appropriately sized and shaped plate of metal which retains between the upper portion of support member 52 the extruded rubber strip 51 and the L-shaped mounting section 46 of the sensing bar.

The infeed housing 10 has a guide or track member 58 on each of its opposing sides which is fastened directly to the side wall 19. Guide members 58 serve to protect the edges of the sensing bar 34, provide a guide or track for the sensing bar during its installation into the infeed housing, and serve as an additional seal against the loss of crop material which can escape between the side walls 19 and the ends of the sensing bar 34.

Figure 3:
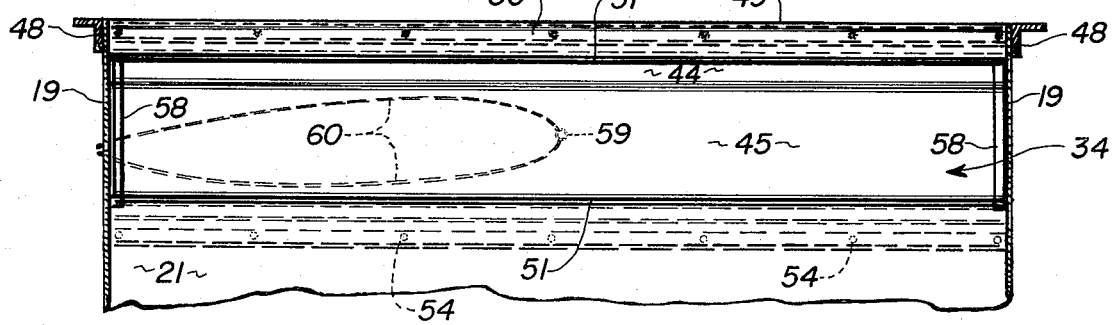
FIG. 3 is an enlarged top plan view of the sensor bar mounted in the infeed housing.

As best seen in FIGS. 2 and 3 the sensing bar 34 has along its guide section 45 an electrical transducer 59 appropriately mounted thereto. A transducer 59 typically is a piezoelectric disc inserted into a small recession in the sensing bar 34. The electrical transducer 59 is connected via wiring 60, only a portion which is shown, to the electronic stone or hard object or non-frangible object detector shown and described in detail in co-pending U.S. patent application Ser. No. 109,932, filed Jan. 4, 1980, assigned to the assignee of the present invention. As best seen in FIG. 3 the transducer 59 is affixed along the centerline of sensing bar 34 midway between the opposing side sheets 19.

In operation crop material is gathered from the field by the header 14 and directed into the infeed housing 10 to be carried upwardly toward the combine by the crop elevator 22. As the crop material is gathered from the field, especially if the crop material is lying in windrows, there is a tendency to gather other objects such as stones or pieces of metal and pass them into the infeed housing 10. The crop material and other objects upon initially entering the infeed housing 10 engage the ramp portion 44 of the sensing bar 34 at the forwardmost portion of the infeed housing 10. This upwardly inclined ramp section 44 serves to ensure that any stones, metal or other non-frangible objects will impact upon the sensing bar 34 before they pass any further into the infeed housing 10. Alternately, the ramp section will deflect stones or other non-frangible objects upwardly into contact with the front guide drum 24 which, by its rotation, effectively redirects the objects downwardly into contact with the flat guide section 45 of sensing bar 34, thereby ensuring that an easily detected impaction occurs. These impactions impart energy to the sensing bar 34 which is manifested by a particular amplitude and frequency at any particular moment. This amplitude and frequency are transmitted to the object detector described in the aforementioned copending U.S. patent application Ser. No. 109,932. When the impacting object or objects generate a response within the known spectral characteristics of stones and other non-frangible objects, the object detector sends a signal to the latching mechanism 41 of the trap door 36. This signal activates the mechanism to release the trap door from the closed position and allows it to pivot about the point 40 to its open position. This opening of the trap door 36 may occur purely by the force of gravity or by some spring assisted or otherwise mechanically assisted drive.

As the crop material with the stone or other non-frangible object therein is moved rearwardly by the crop elevator 22, it continues to travel along the path defined generally by the guide section 45 and infeed housing floor section 35 until it reaches the discontinuity in the bottom surface created by the opening of the trap door 36. When the crop material with the non-frangible objects therein reaches this opening, it continues to move along the initial vectorial direction of travel and passes out of the infeed housing 10. Thus, the undesired non-frangible objects or stones are ejected safely from the infeed housing 10 without being ingested into the threshing and separating apparatus of the combine, thereby avoiding causing considerable damage to this apparatus.

The crop material and non-frangible objects are assisted in retaining their original direction of travel along their predetermined path of travel across the first portion of the bottom surface 21 by the action of the pinch roll 26. Pinch roll 26 insures that the chains 24 and their interconnecting slats 30 at the point of discontinuity in the bottom surface 21 engage and retain the crop material in its initial flow direction. When the operator is satisfied that the stones or other non-frangible objects have been safely removed from the combine, he may manually engage a closing handle to raise the trap door from its generally downward position to its fully raised or closed position.

It should be noted that the extruded rubber strips 51 serve to acoustically isolate the sensing bar 34 from the natural vibrations which are passed into the infeed housing 10 from the header 14 and the combine during actual field operation. This acoustical isolation decreases the amount of noise interference that will be sensed by the sensing bar 34 and thus, in combination with the ramp section 44, enhances the accuracy of the detection of stones and other non-frangible objects by the sensing bar 34 and the object detector.

While the preferred structure and the principles of the present invention have been incorporated as shown and described above, it is to be understood that the invention is not to be limited to the particular details thus presented, but, in fact, widely different means may be employed in the practice of the broader aspects of this invention. The scope of the appended claims is intended to encompass all obvious changes in details, material and arrangement of parts which will occur to one of skill in the art upon reading of the disclosure.

Having thus described the invention, what is claimed is:

1. In an infeed housing for a harvesting and threshing machine attachable on a first end to a harvesting attachment and on a second end to the harvesting and threshing machine effective to receive from the harvesting attachment crop material collected from a field and convey it into the harvesting and threshing machine for processing having:
   (a) a frame with a bottom surface, an upper surface and two opposing sides thereby defining a flow passage for crop material as it is conveyed to the machine;
   (b) conveying means moveably mounted to the infeed housing to convey crop material from the harvesting attachment to the machine and cooperative with the bottom surface to thereby define a predetermined path of travel within the flow path, said conveying means including a front guide drum mounted above said path of travel of said crop material adjacent said first end of said infeed housing for deflecting material entering said first end downwardly toward said bottom surface;
   (c) object removal means moveably connected to the infeed housing intermediate the first end and the second end effective to remove non-frangible objects from the predetermined path of travel;
   (d) non-frangible object detecting means connectable to the object removal means and mountable to the infeed housing; and
   (e) sensing means for sensing non-frangible objects fastened to the bottom surface adjacent the first end between the two opposing sides positioned along the predetermined path of travel and connectable to the object detecting means, the sensing means having a first portion adapted to contact a non-frangible object within said crop material flow path and direct the non-frangible object upwardly toward said guide drum and a second portion adapted to contact non-frangible objects deflected downwardly by said guide drum and to guide the non-frangible object toward the object removal means, the contact with the sensing means by the object further being effective to permit the object detecting means to selectively actuate the object removal means to eject the object from the infeed housing.

2. The apparatus according to claim 1 wherein the sensing means further comprises an elongate bar spanning the bottom surface, having a front edge closest the first end of the infeed housing and an opposing rear edge closest the second end of the infeed housing, the first portion being oblique to the bottom surface to form an object contacting surface along the predetermined path of travel, the second portion being generally parallel to the bottom surface.

3. The apparatus according to claim 1 or 2 wherein the sensing means is detachably fastened to the bottom surface and along the front edge and the rear edge is acoustically isolated from the frame by acoustic isolation means positioned between the frame and the sensing means.

4. The apparatus according to claim 3 wherein the acoustic isolation means further comprises extruded rubber strips surrounding the sensing means adjacent the frame to form an acoustically isolating layer therebetween.

5. The apparatus according to claim 4 wherein the sensing means further comprises an electrical transducer connectable with the detecting means and the object removal means.

6. The apparatus according to claim 5 wherein the object removal means further comprises a swingable trap door pivotally fastened to the frame and selectively releasable in response to a signal from the detecting means to swing from a first closed position to a second open position to thereby create a discontinuity on the bottom surface along the predetermined path of travel to permit detected objects to be ejected from the infeed housing.

7. The apparatus according to claim 6 wherein the conveying means further comprises a crop elevator having a plurality of spaced apart driven chains interconnected by a plurality of spaced apart parallel slat means rotatably mounted about said front guide drum to combinatively engage the crop material and convey it along the predetermined path of travel to the machine.

8. The apparatus according to claim 7 wherein the sensing bar is detachably fastened to the infeed housing, the front edge being seatable in a groove and the rear edge being retained in a recess by means for selectively retaining the rear edge.

9. In a harvesting and threshing machine having an infeed housing with a bottom surface defining in combination with conveying means a predetermined path of travel which is followed by crop material as it is conveyed from a harvesting attachment to the machine, a non-frangible object detecting means fastened to the infeed housing effective to detect non-frangible objects in the crop material as the material is conveyed along the predetermined path of travel, object ejecting means connected to the object detecting means mounted to the infeed housing along the predetermined path of travel effective to eject a detected object upon activation by the detecting means; the improvement comprising:

an elongate sensing bar mounted in the infeed housing to sense the passage of the non-frangible objects said sensing bar having a first portion oblique to the predetermined path of travel and being operable to contact material passing thereover and direct said material in an upward direction toward engagement with said conveying means, said sensing bar further having a second portion positioned contiguous to said first portion and the bottom surface of said infeed housing to permit said material to impact thereon after being directed upwardly by said first portion and to guide said material toward said object ejection means so that crop material and non-frangible objects impacting on said sensing bar induce characteristic signals which are transmitted to the object detecting means for selective activation of the object ejecting means to eject the non-frangible objects from the path of travel of the crop material.

10. The harvesting and threshing machine of claim 9 wherein the conveying means includes a front guide drum mounted above said sensing bar such that material directed upwardly by the first portion of said sensing bar can be engaged by said front guide drum and deflected downwardly toward the second portion of said sensing bar.

11. The harvesting and threshing machine of claim 10 wherein said sensing bar is detachably fastened to the bottom surface of said infeed housing and is acoustically isolated from said infeed housing by extruded rubber strips surrounding said sensing bar adjacent to the bottom surface of said infeed housing to form an acoustically isolating layer therebetween, said rubber strips generally forming a seal between said sensing bar and the bottom surface of said infeed housing to prevent a loss of crop material therebetween.

12. The harvesting and threshing machine of claim 11 wherein said sensing bar includes an electrical transducer fastened thereto and connected to the object detecting means, said electrical transducer being operable to send a signal to the object detecting means to indicate an impaction on said sensing bar by a non-frangible object.

* * * * *